(12) United States Patent
Caciulescu

(10) Patent No.: US 12,153,667 B2
(45) Date of Patent: Nov. 26, 2024

(54) SECURITY AUTOMATION USING ROBOTIC PROCESS AUTOMATION

(71) Applicant: UiPath, Inc., New York, NY (US)

(72) Inventor: Alexandru Razvan Caciulescu, Bucharest (RO)

(73) Assignee: UiPath, Inc., New York, NY (US)

( * ) Notice: Subject to any disclaimer, the term of this patent is extended or adjusted under 35 U.S.C. 154(b) by 613 days.

(21) Appl. No.: 17/127,686

(22) Filed: Dec. 18, 2020

(65) Prior Publication Data
US 2022/0198002 A1    Jun. 23, 2022

(51) Int. Cl.
*G06F 21/55*    (2013.01)

(52) U.S. Cl.
CPC .................. *G06F 21/552* (2013.01)

(58) Field of Classification Search
CPC ........................................... G06F 21/552
See application file for complete search history.

(56) References Cited

U.S. PATENT DOCUMENTS

| | | | |
|---|---|---|---|
| 10,038,711 B1 | 7/2018 | Gorodissky et al. | |
| 10,616,280 B2 | 4/2020 | Purushothaman | |
| 10,802,889 B1* | 10/2020 | Ganesan | G06F 9/5005 |
| 2008/0256638 A1 | 10/2008 | Russ et al. | |
| 2013/0031037 A1 | 1/2013 | Brandt et al. | |
| 2016/0205122 A1 | 7/2016 | Bassett | |
| 2018/0200891 A1* | 7/2018 | Erickson | G05D 1/0297 |
| 2019/0149572 A1* | 5/2019 | Gorodissky | H04L 63/1475 726/25 |
| 2019/0244149 A1 | 8/2019 | Krishnaswamy | |
| 2019/0245883 A1* | 8/2019 | Gorodissky | H04L 63/1433 |
| 2019/0289029 A1* | 9/2019 | Chawla | H04L 63/1425 |
| 2020/0050762 A1* | 2/2020 | Sathyanarayana | H04L 63/1491 |
| 2020/0159648 A1* | 5/2020 | Ghare | G06F 9/4411 |
| 2020/0344256 A1* | 10/2020 | Alabdulhadi | H04L 63/1416 |
| 2020/0358805 A1* | 11/2020 | Segal | H04L 63/1433 |

(Continued)

FOREIGN PATENT DOCUMENTS

| | | | |
|---|---|---|---|
| CN | 101808093 A | * | 8/2010 |
| KR | 1020160147890 A | | 12/2016 |
| WO | 2019240604 A1 | | 12/2019 |

OTHER PUBLICATIONS

Verina Saber • Dina ElSayad • Ayman M. Bahaa-Eldin • Zt Fayed; Automated Penetration Testing, A Systematic Review; 2023 International Mobile, Intelligent, and Ubiquitous Computing Conference (MIUCC) (2023, pp. 373-380); (Year: 2023).*

(Continued)

*Primary Examiner* — Luu T Pham
*Assistant Examiner* — Chao Wang
(74) *Attorney, Agent, or Firm* — Patel PC; Sheetal S. Patel; Michael A. Leonard, II

(57) ABSTRACT

Security automation, such as penetration testing or security hardening, is performed using robotic process automation (RPA) by directly connecting one or more robots into an operating system of a platform. The one or more robots execute a workflow to simulate the penetration testing of the operating system to identify malicious activity or vulnerable configurations within the operating system. The one or more robots also generate a report for the user identifying the malicious activity, misconfigurations or vulnerabilities within the environment.

30 Claims, 10 Drawing Sheets

(56) References Cited

U.S. PATENT DOCUMENTS

| | | | |
|---|---|---|---|
| 2021/0273967 A1* | 9/2021 | Vela | H04L 63/1433 |
| 2021/0377307 A1* | 12/2021 | Santana De Oliveira | G06F 18/217 |
| 2022/0092607 A1* | 3/2022 | Jeske | G06F 11/3616 |
| 2022/0147386 A1* | 5/2022 | Goyal | G06F 9/4881 |

OTHER PUBLICATIONS

Shachar Siboni • Vinay Sachidananda • Yair Meidan • Michael Bohadana • Yael Mathov • Suhas Bhairav • Asaf Shabtai • Yuval Elovici; Security Testbed for Internet-of-Things Devices; IEEE Transactions on Reliability (vol. 68, Issue: 1, 2019, pp. 23-44); (Year: 2018).*

Zhang Yuehong; Discussion on the realization technology of virtual hacker robot; 2021 International Conference on Artificial Intelligence and Electromechanical Automation (AIEA) (2021, pp. 74-77); (Year: 2021).*

"Automated Penetration Testing Software", retrieved on the internet Dec. 18, 2020, at https://portswigger.net/solutions/penetration-testing/automated-penetration-testing.

"Automated Penetration Testing", Intruder, retrieved on the internet Dec. 18, 2020, at https://www.intruder.io/automated-penetration-testing.

"Pentest Robots Automate 80% of Your Grunt Work Using RPA", Black Hat, retrieved on the internet Dec. 18, 2020, at https://www.blackhat.com/sponsor-posts/11152020-pentest-tools.html.

International Search Report & Written Opinion, issued Feb. 17, 2022, PCT Patent Application No. PCT/US21/56941.

Office Action issued Jun. 29, 2023, KR Patent Application No. 10-2021-7042688.

* cited by examiner

SECURITY AUTOMATION USING ROBOTIC PROCESS AUTOMATION

FIELD

The present invention generally relates to robotic process automation (RPA), and more specifically, to performing security (or penetration/hardening) tests on the entire environment, machine, or virtual machine (VM) using RPA.

BACKGROUND

A penetration test, also known as a pen test, pentest or ethical hacking, is an authorized simulated cyberattack on a computer system, performed to evaluate the security of the system. The test is performed to identify both weaknesses (or vulnerabilities), including the potential for unauthorized parties to gain access to the system's features and data, as well as strengths, enabling a full risk assessment to be completed.

There are antivirus applications that perform tests on dynamic environment to check whether there are any potential frauds/viruses that are present in the system. These antivirus applications search files and signature (or hashes) to discover potential threats or viruses. However, these antivirus applications do not perform penetration testing, similar to those performed by humans.

Accordingly, an improved method for performing penetration testing of the entire environment, machine, or VM using RPA may be beneficial.

SUMMARY

Certain embodiments of the present invention may provide solutions to the problems and needs in the art that have not yet been fully identified, appreciated, or solved by current antivirus technologies. For example, some embodiments of the present invention pertain to a method for performing penetration testing of the entire environment, machine, or VM without human intervention.

In an embodiment, a computer-implemented method for performing penetration testing using RPA includes directly connecting one or more robots into an operating system of a platform. The method also includes executing, by the one or more robots, a workflow to simulate the penetration testing of the operating system to identify malicious activity or vulnerable configurations within the operating system. The method further includes generating, by the one or more robots, a report for the user identifying the malicious activity, misconfigurations or vulnerabilities within the environment.

In another embodiment, an apparatus configured to perform penetration testing using RPA. The apparatus includes memory comprising a set of instructions, and at least one processor. The set of instructions are configured to cause the at least one processor to execute directly connecting one or more robots into an operating system of a platform. The set of instructions are further configured to cause the at least one processor to execute, by the one or more robots, a workflow to simulate the penetration testing of the operating system to identify malicious activity or vulnerable configurations within the operating system. The set of instructions are further configured to cause the at least one processor to execute generating, by the one or more robots, a report for the user identifying the malicious activity, misconfigurations or vulnerabilities within the environment.

In yet another embodiment, a computer program is embodied on a non-transitory computer-readable medium. The computer program is configured to cause at least one processor to execute directly connecting one or more robots into an operating system of a platform. The computer program is further configured to cause at least one processor to execute, by the one or more robots, a workflow to simulate the penetration testing of the operating system to identify malicious activity or vulnerable configurations within the operating system. The computer program is further configured to cause at least one processor to execute and generate a report for the user identifying the malicious activity, misconfigurations or vulnerabilities within the environment.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Figure 1:
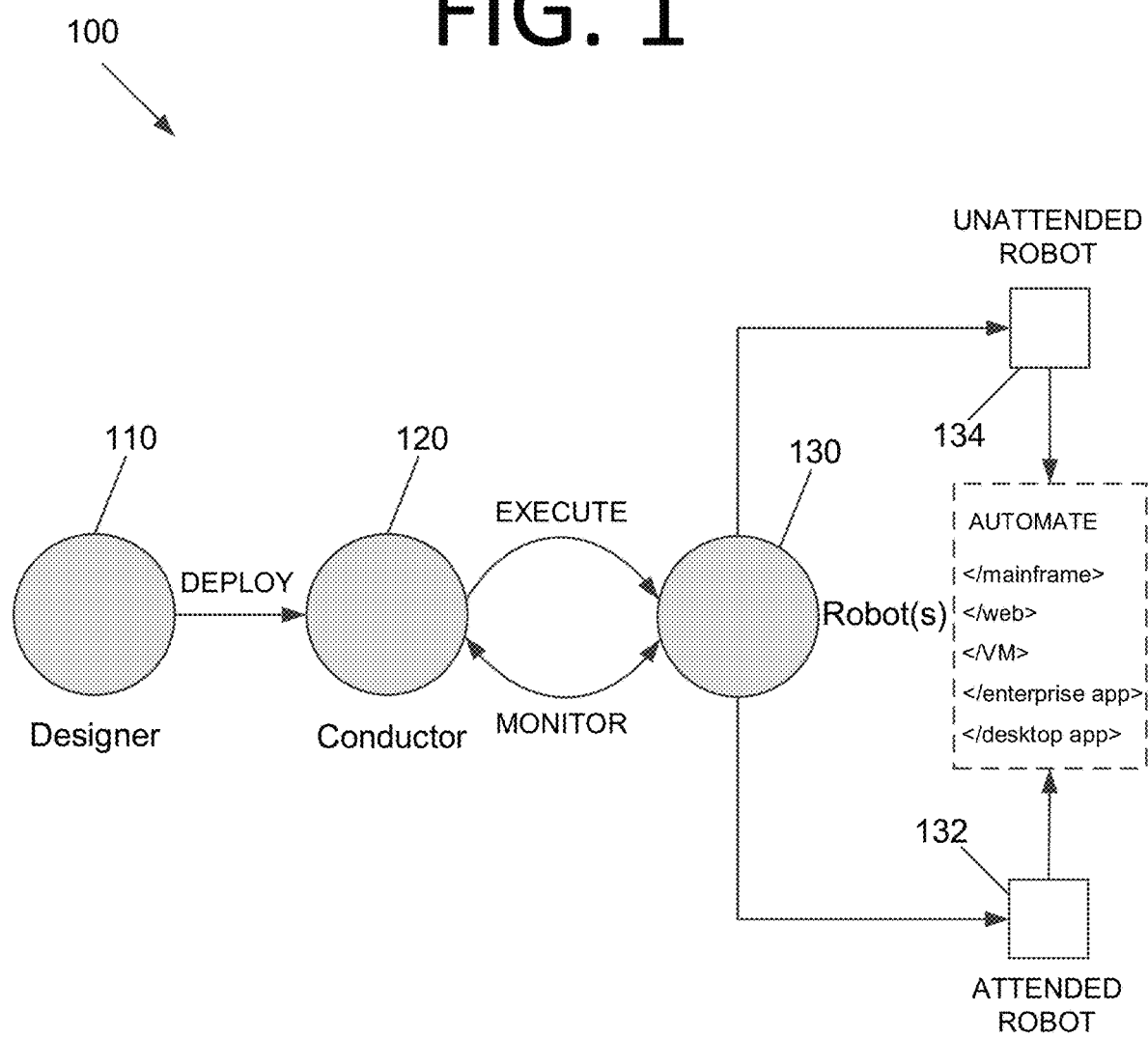
FIG. 1 is an architectural diagram illustrating an RPA system, according to an embodiment of the present invention.

Some embodiments pertain to a method for performing penetration (pen) testing using RPA without human intervention. In an embodiment, to test the entire environment and simulate the pen tester, the robot is directly connected and hooked into the operating system (OS). For example, robot(s) currently deployed in the OS may be utilized for testing and simulating the pen test. In another example, a specific robot, not currently utilized by any application in the OS, can be deployed to test and simulate the pen test. For example, during the pen test, the robot searches the Windows® Registry and scrapes data from the file system to search for security vulnerabilities.

To perform the pen testing, multiple approaches may be employed. For example, a workflow (specific for each platform) is written such that, when executed, the workflow causes the robot to perform actions similar to those performed by the pen tester. For instance, Windows® OS versus Linux® OS may be tested differently. For that reason, the workflow must be written specifically to the platform.

In instances where the pen tester's actions are performed by a mouse, the actions performed are recorded. For example, a robot records the actions of a user (e.g., pen tester), when the user is performing the pen test. Using the recorded actions of the user, the robot then tests the environment to check for security vulnerabilities caused by various factors. These factors may include malicious activity on the machine, vulnerable configurations, suspicious activities, viruses, etc.

In some embodiments, the ability to record the actions or steps conducted by the pen tester and store the recorded actions or steps may be atomic or chained sequences. Chained sequences may be defined as putting atomic actions one after another, i.e., creating a sequence of steps. Atomic may be defined as a single step or a unique (indivisible) action.

It should be appreciated that the robot records the pen tester's actions during each penetration test of the environment. These actions are then stored in a database. By continuously recording the user's actions, the pen tester or robot may continue to improve the pen testing, and in some embodiments, replay the pen tester's actions.

In certain embodiments, custom security workflows are created, i.e., the one or more sequences in a pen test are modified by adding, removing, or editing each individual component for a specific system and/or environment. For example, a previous workflow or pen test is reviewed, and based on the review, the pen test is modified to add, remove, or edit one or more steps in the pen test. This may be performed by the pen tester or by a machine learning (ML) algorithm.

In certain embodiments, using ML algorithms, the robot uses the recorded actions to perform the penetration test. For example, the ML algorithms compile a new test or modify a previous pen test for the robot to execute based on previously recorded actions by the robot or by the pen tester. In some other embodiments, two separate workflows may be analyzed by the robot or pen tester and may be combined to create a single (unitary) workflow for the robot to execute. This may be done to optimize the pen testing process.

As briefly discussed above, the robot may search and/or evaluate for security vulnerabilities. One method to evaluate security vulnerabilities involves the robot searching for updates and patches, identifying out-of-date software. The robot may also access public or private databases comprising of vulnerabilities. By accessing the public or private database, the robot searches for the vulnerabilities associated with the identified out-of-data software, or in some embodiments, for any software installed on the OS.

Another approach would be a 'network' approach. Under this approach, the robot scans the ports and services open or available on the computing device or OS. The robot may look up each service and identify weak credential logins. In one example, the robot may use 'default' credential logins to access the scanned port and services. The reason for this is because many times, the user may not change the login credentials and continue to utilize the 'default' credential logins. The robot may also use a 'brute force' approach. Under this approach, the robot may use various passwords and credentials to access the ports and services. Another aspect of this 'network' approach would be to test the open ports and services with malicious payloads from known vulnerabilities and analyze the response, determining if said port or service has been comprised in any way.

In some embodiments, each robot may be afforded a different level of access. For example, let's say through social engineering a user's account (e.g., from legal department) is compromised. The robot may infiltrate the environment through the comprised user's account. On the other hand, if the admin account is compromised, the robot may infiltrate the comprised admin account, which has a different level of access than other users. Depending on the level of access, the robot may attempt to infiltrate different access points across the OS, e.g., ports or services.

In another embodiments, the robot may be assigned a predefined level of access. For example, there may be a robot with a normal user access, another robot with admin user access, and so forth. This way, each robot may execute a workflow for the pen test that is specific for the level of access assigned thereto.

Some embodiments may allow for security hardening in a dynamic way. For example, in software development, there is an adopted practice of fuzz testing. With fuzz testing, before release of software, the software is tested to ensure that security issues or vulnerabilities are reduced to a minimum. The robot in this embodiment may bombard the target with different malicious or malformed payloads and look for unexpected behavior; hence, security hardening in a dynamic way. By security hardening, the security of the computing system is improved, ensuring that vulnerabilities within the computing system are reduced at a minimum or eliminated.

In some embodiments, the pen test may be assisted by the robot. For example, the robot is deployed to automate eighty (80) percent of the pen test, leaving twenty (20) percent of the pen testing to the individual user (or pen tester). It should be appreciated the percentage of automation conducted by the robot may vary depending on the configuration of the pen test and the environment of the computing system, to name a few. In some other embodiment, the robot produces a report of the pen test. In those embodiments, the pen tester may review the results of the automated pen test, and complete the remaining pen test.

In another embodiments, the pen tester may deploy one or more robots in a cluster of the pen testing automations. In these embodiments, the pen tester may concurrently perform pen testing or wait until the results from the pen testing automations are returned. In one example, in a developer's workstation, a number of ports and services are open at any given time. In this example, the one or more robots may perform pen testing automation on the number of ports and services that are open, leaving the pen tester to test any untested portion of the workstation. The untested portion may be any new tools or software that the one or more robots are unaware of. However, if you take the other example of a dedicated machine in which one or more users have a specific interaction, the one or more robots may perform the pen test automation and confirm that all other programs are closed or secured and not accessible by the one or more users.

Certain embodiments allow for the ability to perform dynamic testing, either manually targeted or automatically selected, on different services or binaries by using fuzzing. With fuzzing, for example, potentially malicious or malformed payloads are automatically generated by the robot executing the workflow to test the resilience and security of the target environment or OS. In this example, the primary objective is to provoke an unexpected behavior, this can be a denial of service (DoS) by crashing the target or getting erroneous outputs altogether. Another objective would be to hijack the control flow or gain access to privileged data/capabilities by leveraging these payloads.

Let's think of this as a network approach or a standard local approach. From a network approach, the network port is scanned to identify open ports. Upon identifying the open ports, a fuzzing attack is then launched by the robot. By fuzzing, a sequence of commands are executed. These commands are either correctly formatted or altered in such a way that the altered commands performed can lead to unexpected behavior such as access to confidential data or features not normally accessible.

In a cluster environment, the robots may be managed and deployed on any system in the environment from a centralized command point and produce reports after execution/deployment. In this embodiment, a centralized command point may control and deploy (and monitor) the actions of the robots deployed in a customer's cluster. For example, a specific instance may be dedicated to pen testing robots, thereby segregating the pen testing robots from other robots in Orchestrator™. This way, the robots can be treated differently based on the security level assigned to the robot.

FIG. 1 is an architectural diagram illustrating an RPA system 100, according to an embodiment of the present invention. RPA system 100 includes a designer 110 that allows a developer to design and implement workflows. Designer 110 may provide a solution for application integration, as well as automating third-party applications, administrative Information Technology (IT) tasks, and business IT processes. Designer 110 may facilitate development of an automation project, which is a graphical representation of a business process. Simply put, designer 110 facilitates the development and deployment of workflows and robots.

The automation project enables automation of rule-based processes by giving the developer control of the execution order and the relationship between a custom set of steps developed in a workflow, defined herein as "activities." One commercial example of an embodiment of designer 110 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, Finite State Machines (FSMs), and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 110, execution of business processes is orchestrated by conductor 120, which orchestrates one or more robots 130 that execute the workflows developed in designer 110. One commercial example of an embodiment of conductor 120 is UiPath Orchestrator™. Conductor 120 facilitates management of the creation, monitoring, and deployment of resources in an environment. Conductor 120 may act as an integration point with third-party solutions and applications.

Conductor 120 may manage a fleet of robots 130, connecting and executing robots 130 from a centralized point. Types of robots 130 that may be managed include, but are not limited to, attended robots 132, unattended robots 134, development robots (similar to unattended robots 134, but used for development and testing purposes), and nonproduction robots (similar to attended robots 132, but used for development and testing purposes). Attended robots 132 are triggered by user events and operate alongside a human on the same computing system. Attended robots 132 may be used with conductor 120 for a centralized process deployment and logging medium. Attended robots 132 may help the human user accomplish various tasks, and may be triggered by user events. In some embodiments, processes cannot be started from conductor 120 on this type of robot and/or they cannot run under a locked screen. In certain embodiments, attended robots 132 can only be started from a robot tray or from a command prompt. Attended robots 132 should run under human supervision in some embodiments.

Unattended robots 134 run unattended in virtual environments and can automate many processes. Unattended robots 134 may be responsible for remote execution, monitoring, scheduling, and providing support for work queues. Debugging for all robot types may be run in designer 110 in some embodiments. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

Conductor 120 may have various capabilities including, but not limited to, provisioning, deployment, configuration, queueing, monitoring, logging, and/or providing interconnectivity. Provisioning may include creating and maintenance of connections between robots 130 and conductor 120 (e.g., a web application). Deployment may include assuring the correct delivery of package versions to assigned robots 130 for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 120 may provide interconnectivity by acting as the centralized point of communication for third-party solutions and/or applications.

Robots 130 are execution agents that run workflows built in designer 110. One commercial example of some embodiments of robot(s) 130 is UiPath Robots™. In some embodiments, robots 130 install the Microsoft Windows® Service Control Manager (SCM)-managed service by default. As a result, such robots 130 can open interactive Windows® sessions under the local system account, and have the rights of a Windows® service.

In some embodiments, robots 130 can be installed in a user mode. For such robots 130, this means they have the same rights as the user under which a given robot 130 has been installed. This feature may also be available for High Density (HD) robots, which ensure full utilization of each machine at its maximum potential. In some embodiments, any type of robot 130 may be configured in an HD environment.

Robots 130 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 120 and the execution hosts (i.e., the computing systems on which robots 130 are executed). These services are trusted with and manage the credentials for robots 130. A console application is launched by the SCM under the local system.

User mode robot services in some embodiments manage and monitor Windows® sessions and act as a proxy between conductor 120 and the execution hosts. User mode robot services may be trusted with and manage the credentials for robots 130. A Windows® application may automatically be launched if the SCM-managed robot service is not installed.

Executors may run given jobs under a Windows® session (i.e., they may execute workflows. Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 130 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 110 may also be independent of browser zoom level in some embodiments. For applications that are DPI-unaware or intentionally marked as unaware, DPI may be disabled in some embodiments.

Figure 2:
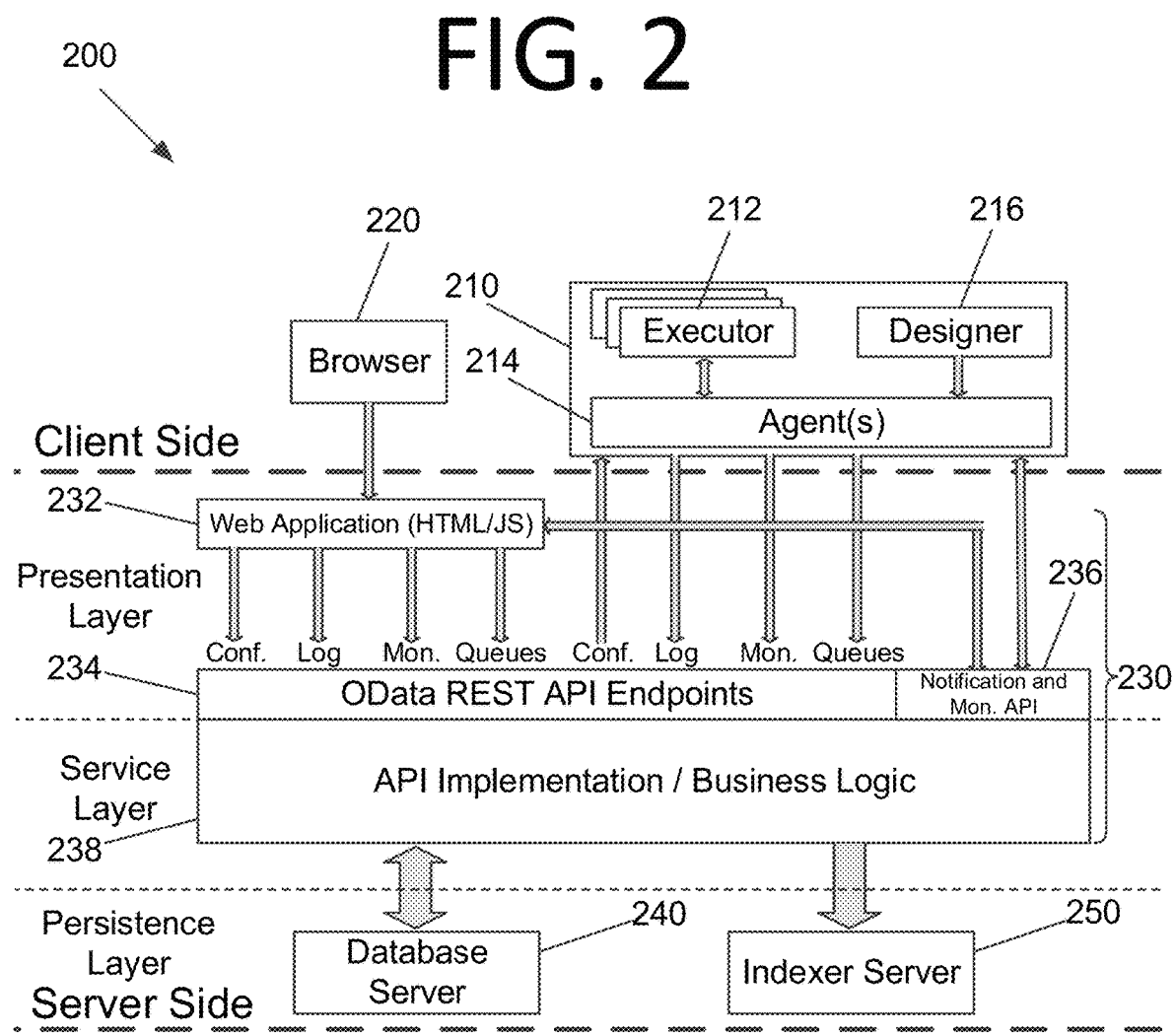
FIG. 2 is an architectural diagram illustrating a deployed RPA system, according to an embodiment of the present invention.

FIG. 2 is an architectural diagram illustrating a deployed RPA system 200, according to an embodiment of the present invention. In some embodiments, RPA system 200 may be, or may be a part of, RPA system 100 of FIG. 1. It should be noted that the client side, the server side, or both, may include any desired number of computing systems without deviating from the scope of the invention. On the client side, a robot application 210 includes executors 212, an agent 214, and a designer 216. However, in some embodiments, designer 216 may not be running on computing system 210. Executors 212 are running processes. Several business projects may run simultaneously, as shown in FIG. 2. Agent 214 (e.g., a Windows® service) is the single point of contact for all executors 212 in this embodiment. All messages in this embodiment are logged into conductor 230, which processes them further via database server 240, indexer server 250, or both. As discussed above with respect to FIG. 1, executors 212 may be robot components.

In some embodiments, a robot represents an association between a machine name and a username. The robot may manage multiple executors at the same time. On computing systems that support multiple interactive sessions running simultaneously (e.g., Windows® Server 2012), multiple robots may be running at the same time, each in a separate Windows® session using a unique username. This is referred to as HD robots above.

Agent 214 is also responsible for sending the status of the robot (e.g., periodically sending a "heartbeat" message indicating that the robot is still functioning) and downloading the required version of the package to be executed. The communication between agent 214 and conductor 230 is always initiated by agent 214 in some embodiments. In the notification scenario, agent 214 may open a WebSocket channel that is later used by conductor 230 to send commands to the robot (e.g., start, stop, etc.).

On the server side, a presentation layer (web application 232, Open Data Protocol (OData) Representative State Transfer (REST) Application Programming Interface (API) endpoints 234, and notification and monitoring 236), a service layer (API implementation/business logic 238), and a persistence layer (database server 240 and indexer server 250) are included. Conductor 230 includes web application 232, OData REST API endpoints 234, notification and monitoring 236, and API implementation/business logic 238. In some embodiments, most actions that a user performs in the interface of conductor 230 (e.g., via browser 220) are performed by calling various APIs. Such actions may include, but are not limited to, starting jobs on robots, adding/removing data in queues, scheduling jobs to run unattended, etc. without deviating from the scope of the invention. Web application 232 is the visual layer of the server platform. In this embodiment, web application 232 uses Hypertext Markup Language (HTML) and JavaScript (JS). However, any desired markup languages, script languages, or any other formats may be used without deviating from the scope of the invention. The user interacts with web pages from web application 232 via browser 220 in this embodiment in order to perform various actions to control conductor 230. For instance, the user may create robot groups, assign packages to the robots, analyze logs per robot and/or per process, start and stop robots, etc.

In addition to web application 232, conductor 230 also includes service layer that exposes OData REST API endpoints 234. However, other endpoints may be included without deviating from the scope of the invention. The REST API is consumed by both web application 232 and agent 214. Agent 214 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 230. Queueing REST endpoints may be responsible for queues and queue item management, such as adding data to a queue, obtaining a transaction from the queue, setting the status of a transaction, etc.

Monitoring REST endpoints may monitor web application 232 and agent 214. Notification and monitoring API 236 may be REST endpoints that are used for registering agent 214, delivering configuration settings to agent 214, and for sending/receiving notifications from the server and agent 214. Notification and monitoring API 236 may also use Web Socket communication in some embodiments.

The persistence layer includes a pair of servers in this embodiment—database server 240 (e.g., a SQL server) and indexer server 250. Database server 240 in this embodiment stores the configurations of the robots, robot groups, associated processes, users, roles, schedules, etc. This information is managed through web application 232 in some embodiments. Database server 240 may manage queues and queue items. In some embodiments, database server 240 may store messages logged by the robots (in addition to or in lieu of indexer server 250).

Indexer server 250, which is optional in some embodiments, stores and indexes the information logged by the robots. In certain embodiments, indexer server 250 may be disabled through configuration settings. In some embodiments, indexer server 250 uses ElasticSearch®, which is an open source project full-text search engine. Messages logged by robots (e.g., using activities like log message or write line) may be sent through the logging REST endpoint(s) to indexer server 250, where they are indexed for future utilization.

Figure 3:
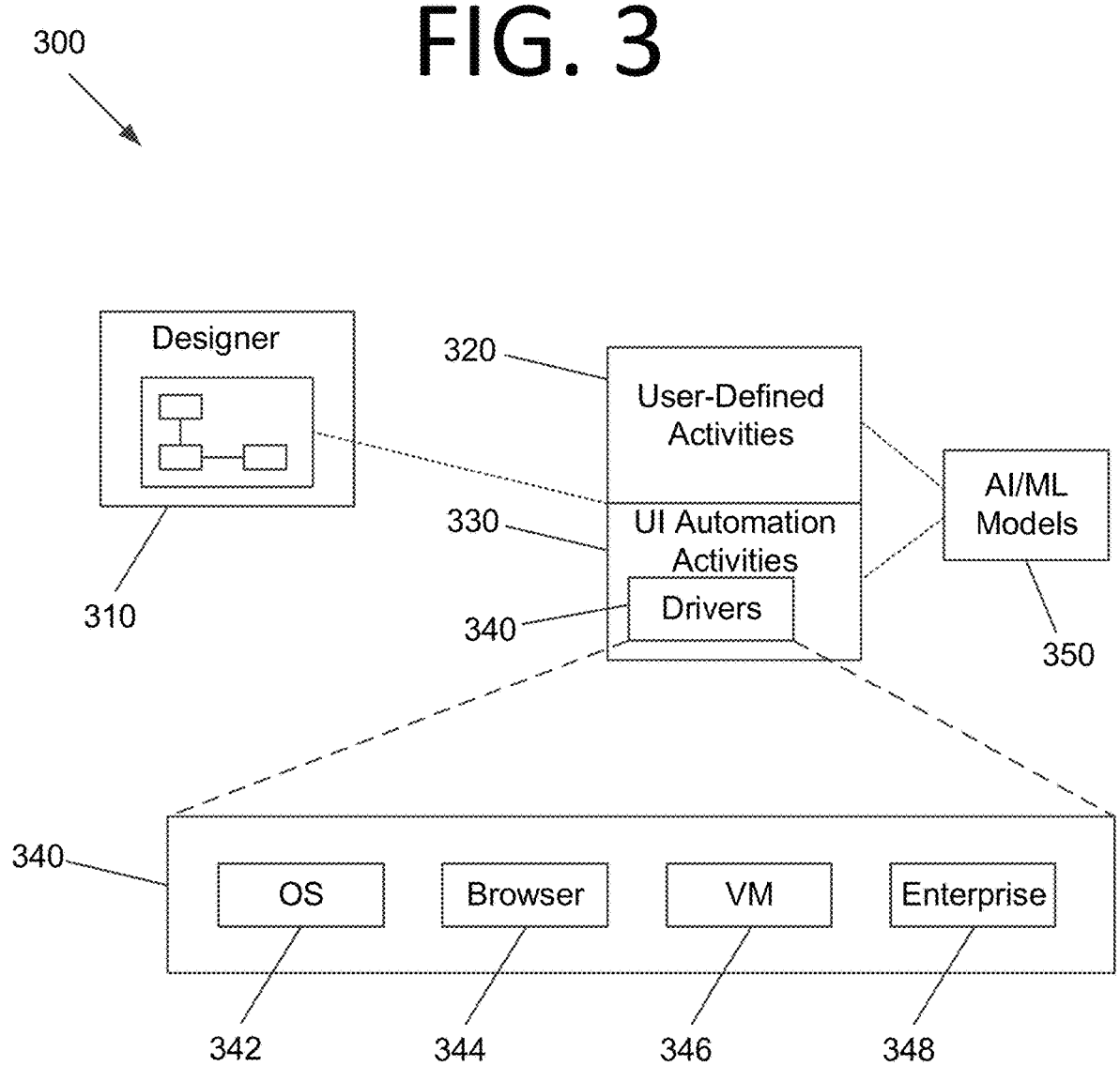
FIG. 3 is an architectural diagram illustrating the relationship between a designer, activities, and drivers, according to an embodiment of the present invention.

FIG. 3 is an architectural diagram illustrating the relationship 300 between a designer 310, activities 320, 330, drivers 340, and AI/ML models 350, according to an embodiment of the present invention. Per the above, a developer uses designer 310 to develop workflows that are executed by robots. Workflows may include user-defined activities 320 and UI automation activities 330. User-defined activities 320 and/or UI automation activities 330 may call one or more AI/ML models 350 in some embodiments, which may be located locally to the computing system on which the robot is operating and/or remotely thereto. Some embodiments are able to identify non-textual visual components in an image, which is called computer vision (CV) herein. Some CV activities pertaining to such components may include, but are not limited to, click, type, get text, hover, element exists, refresh scope, highlight, etc. Click in some embodiments identifies an element using CV, optical character recognition (OCR), fuzzy text matching, and multi-anchor, for example, and clicks it. Type may identify an element using the above and types in the element. Get text may identify the location of specific text and scan it using OCR. Hover may identify an element and hover over it. Element exists may check whether an element exists on the screen using the techniques described above. In some embodiments, there may be hundreds or even thousands of activities that can be implemented in designer 310. However, any number and/or type of activities may be available without deviating from the scope of the invention.

UI automation activities 330 are a subset of special, lower level activities that are written in lower level code (e.g., CV activities) and facilitate interactions with the screen. UI automation activities 330 facilitate these interactions via drivers 340 and/or AI/ML models 350 that allow the robot to interact with the desired software. For instance, drivers 340 may include OS drivers 342, browser drivers 344, VM drivers 346, enterprise application drivers 348, etc. One or more of AI/ML models 350 may be used by UI automation activities 330 in order to determine perform interactions with the computing system. In some embodiments, AI/ML models 350 may augment drivers 340 or replace them completely. Indeed, in certain embodiments, drivers 340 are not included.

Drivers 340 may interact with the OS at a low level looking for hooks, monitoring for keys, etc. They may facilitate integration with Chrome®, IE®, Citrix®, SAP®, etc. For instance, the "click" activity performs the same role in these different applications via drivers 340.

Figure 4:
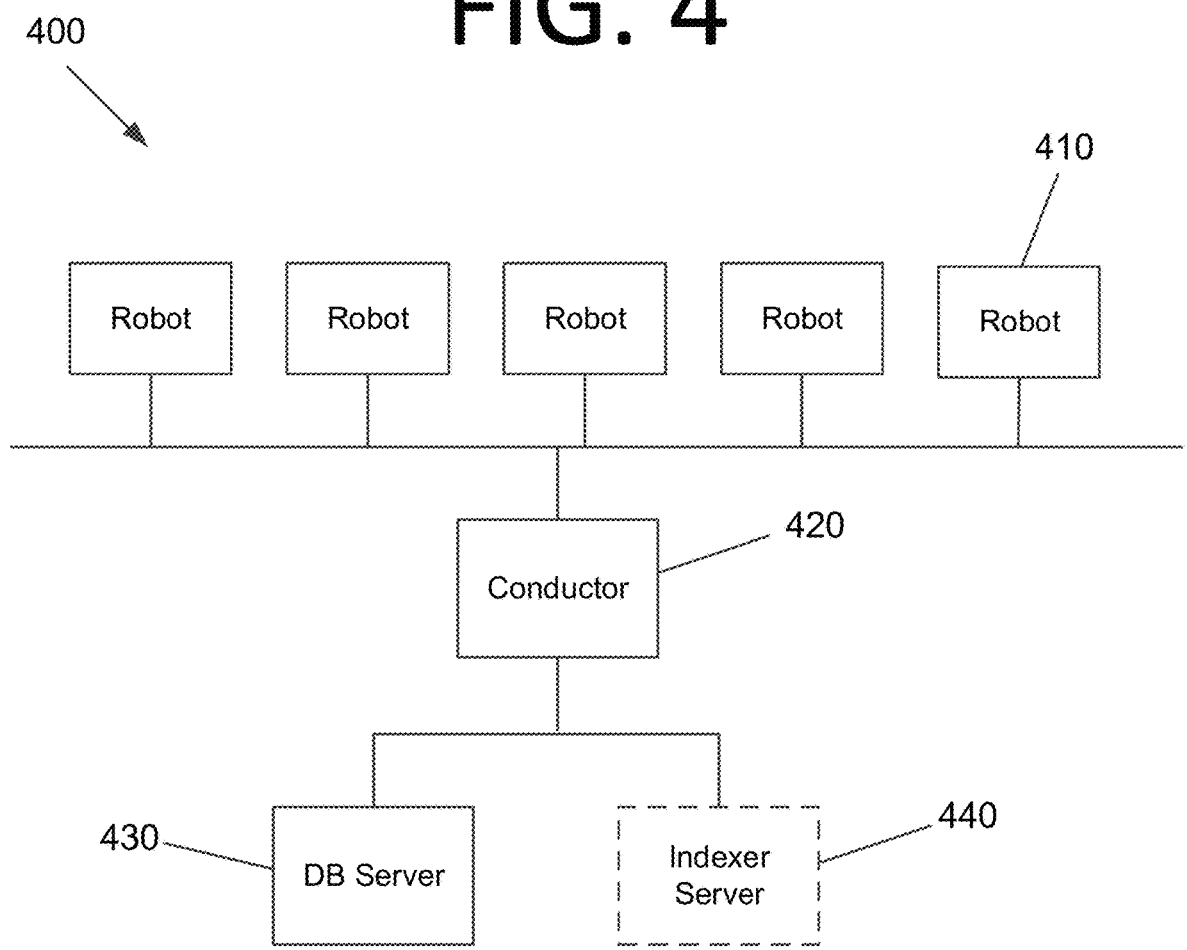
FIG. 4 is an architectural diagram illustrating an RPA system, according to an embodiment of the present invention.

FIG. 4 is an architectural diagram illustrating an RPA system 400, according to an embodiment of the present invention. In some embodiments, RPA system 400 may be or include RPA systems 100 and/or 200 of FIGS. 1 and/or 2. RPA system 400 includes multiple client computing systems 410 running robots. Computing systems 410 are able to communicate with a conductor computing system 420 via a web application running thereon. Conductor computing system 420, in turn, is able to communicate with a database server 430 and an optional indexer server 440.

With respect to FIGS. 1 and 3, it should be noted that while a web application is used in these embodiments, any suitable client/server software may be used without deviating from the scope of the invention. For instance, the conductor may run a server-side application that communicates with non-web-based client software applications on the client computing systems.

Figure 5:
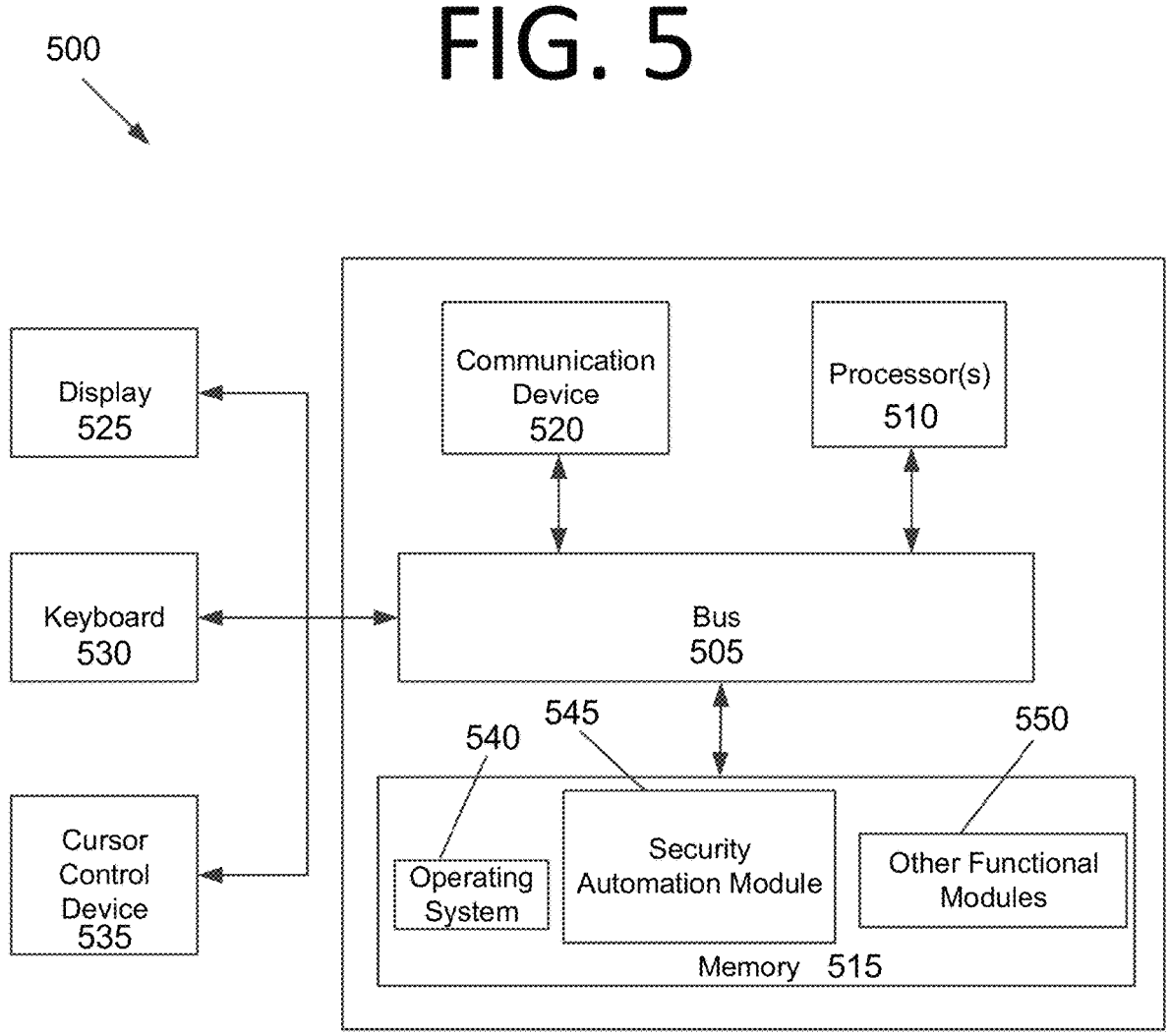
FIG. 5 is an architectural diagram illustrating a computing system configured to perform penetration testing without human intervention, according to an embodiment of the present invention.

FIG. 5 is an architectural diagram illustrating a computing system 500 configured to perform penetration testing without human intervention, according to an embodiment of the present invention. In some embodiments, computing system 500 may be one or more of the computing systems depicted and/or described herein. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 500 includes a communication device 520, such as a transceiver, to provide access to a communications network via a wireless and/or wired connection. In some embodiments, communication device 520 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beam-steering, a combination thereof, and or any other antenna configuration without deviating from the scope of the invention.

Processor(s) 510 are further coupled via bus 505 to a display 525, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 525 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system 500. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an OS 540 for computing system 500. The modules further include a security automation module 545 that is configured to perform all or part of the processes described herein or derivatives thereof. For example, pen testing module 545 may execute a workflow (or it may be the workflow itself) to cause one or more robots to simulate a penetration test on the OS. Computing system 500 may include one or more additional functional modules 550 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems. The computing system could be part of or otherwise accessible by a local area network (LAN), a mobile communications network, a satellite communications network, the Internet, a public or private cloud, a hybrid cloud, a server farm, any combination thereof, etc. Any localized or distributed architecture may be used without deviating from the scope of the invention.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 6:
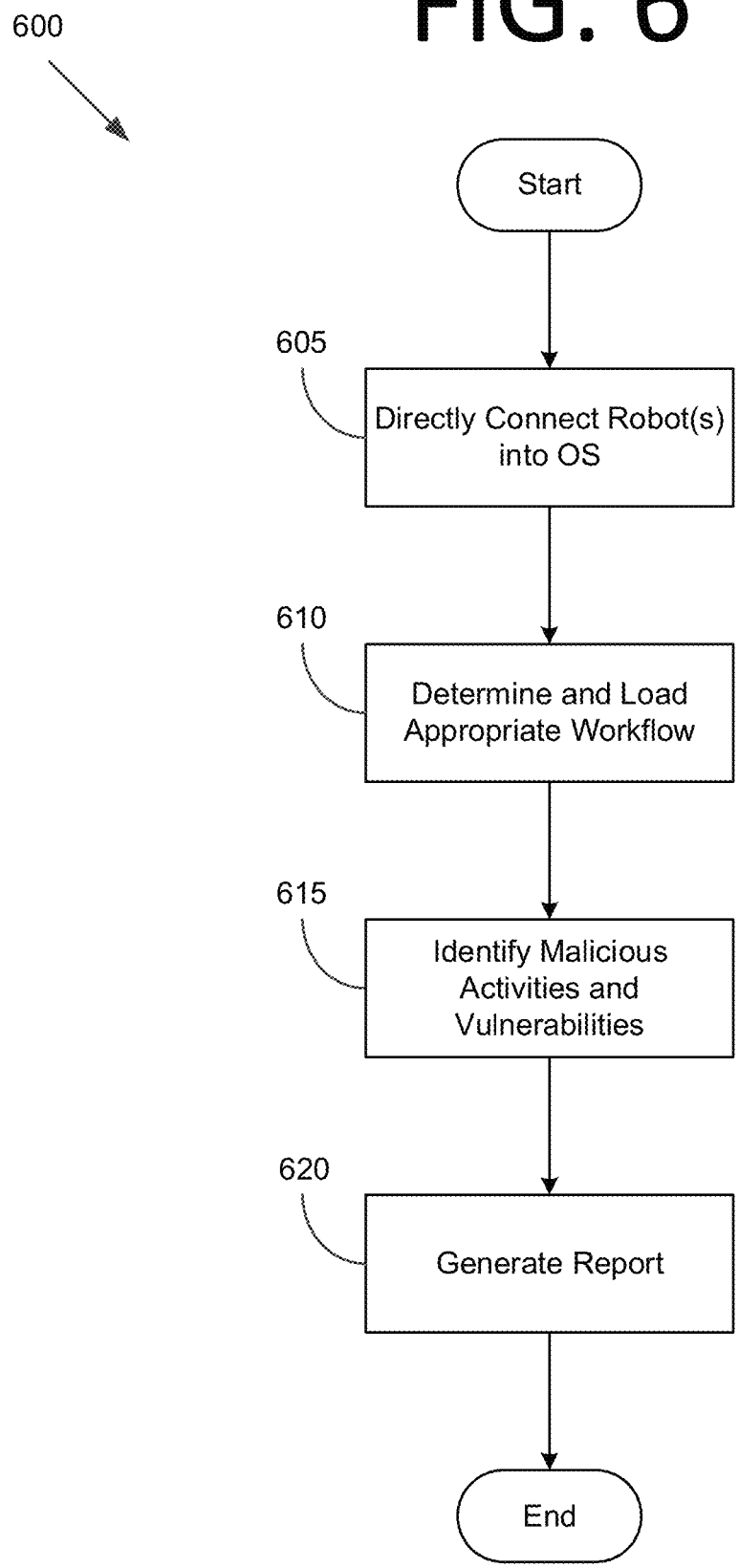
FIG. 6 is a flow diagram illustrating a method for testing an entire environment for security vulnerabilities, according to an embodiment of the present invention.

FIG. 6 is a flow diagram illustrating a method 600 for testing an entire environment for security vulnerabilities, according to an embodiment of the present invention. In some embodiments, a security automation (e.g., pen testing) workflow may be performed on one or more OSs. To begin, method 600 may begin with directly connecting one or more robots into an OS of a platform at 605. At 610, the robot determines the OS and loads the appropriate workflow in order to execute the pen test. This is important because a service may be running on a different port number or may have a different binary depending on the OS. For this reason, the robot may also determine the environment in which the OS is operating and/or the user level access for the given OS or computing system. It should be noted that this determination may be achieved by running different commands, and based on the output of the command, the OS type may be determined. Based on this determination, the robot may load the workflow to perform the pen test. At 615, the one or more robots simulate the pen test on the OS to identify malicious activity or vulnerable configurations within the OS and/or environment. At 620, a report is generated for the user. The report identifies the malicious activity or the vulnerable configurations within the operating system.

The user may then fix the vulnerabilities identified in the report. In another embodiment, the robot may identify the malicious activity and/or vulnerable configurations and install a patch to fix the identified issues, install a security update, shut down a service associated with the vulnerability, terminate the execution of a program/binary, close one or more ports, etc.

In some additional embodiments, the robot reports the malicious activity and/or vulnerabilities to a system robot. The system robot may then perform the corrective measures based on the report. See, for example, FIG. 8. These corrective measures may be similar to those discussed in the paragraph above.

Figure 7:
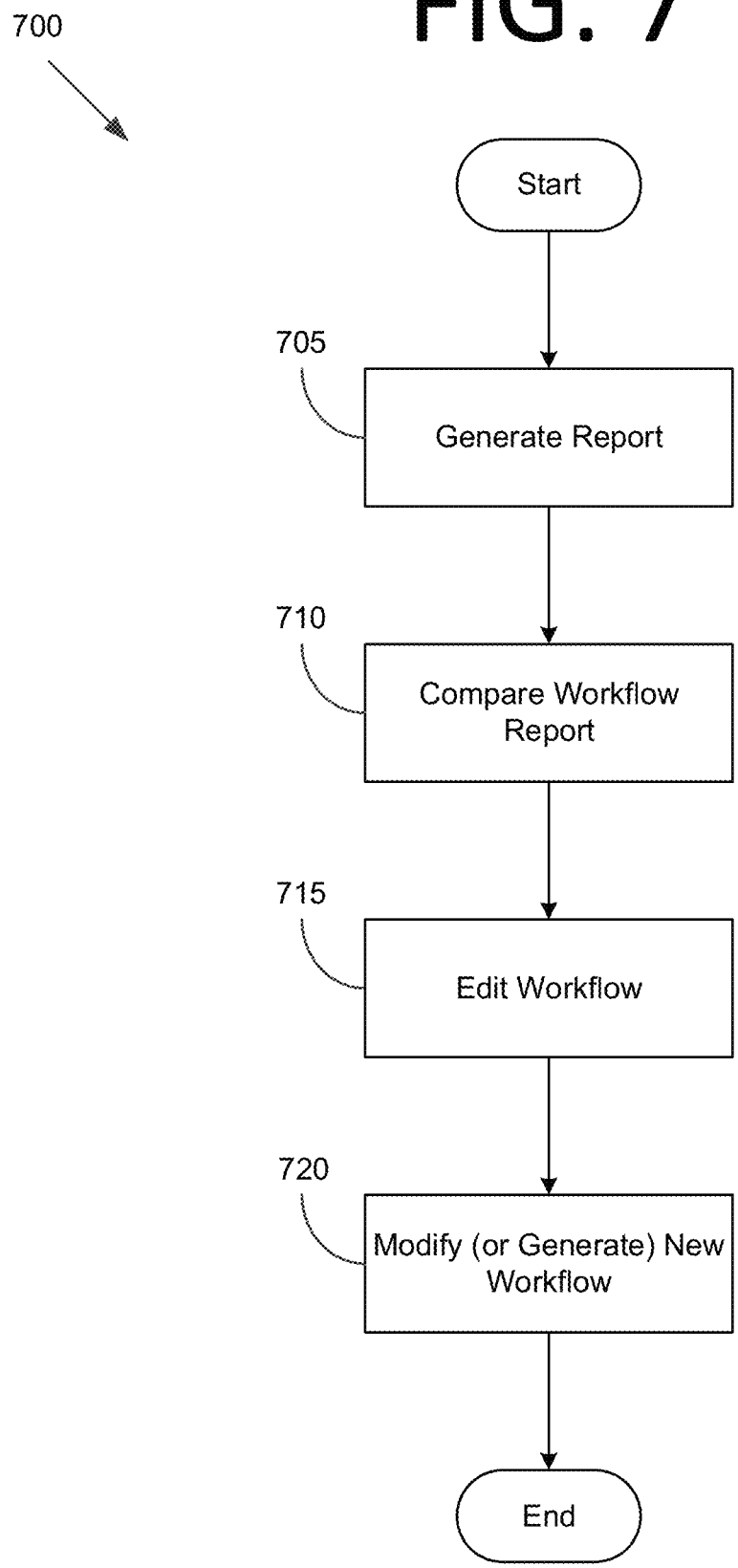
FIG. 7 is a flow diagram illustrating a method for modifying a workflow, according to an embodiment of the present invention.

FIG. 7 is a flow diagram illustrating a method 700 for modifying a workflow, according to an embodiment of the present invention. In some embodiments, method 700 may begin with at 705 with the robot generating the report of the pen test after completion of the pen test by the robot. At 710, a ML algorithm compares the workflow report against a repository of workflows and/or results from prior pen tests. In some embodiments, the workflow may be compared against previously recorded pen tests either by the pen tester or the robot. At 715, the ML algorithm modifies the workflow by modifying one or more steps in the workflow or combines the workflow with another workflow previously stored in the database. At 720, the ML algorithm generates a new modified workflow for the robot to execute. This method is particularly useful because previous runtime errors in the workflow, flaws or holes in the workflow, etc., may be removed, thereby improving the overall workflow for the pen test.

The process steps performed in FIGS. 6 and 7 may be performed by a computer program, encoding instructions for the processor(s) to perform at least part of the process(es) described in FIGS. 6 and 7, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in FIGS. 6 and 7, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

Figure 8:
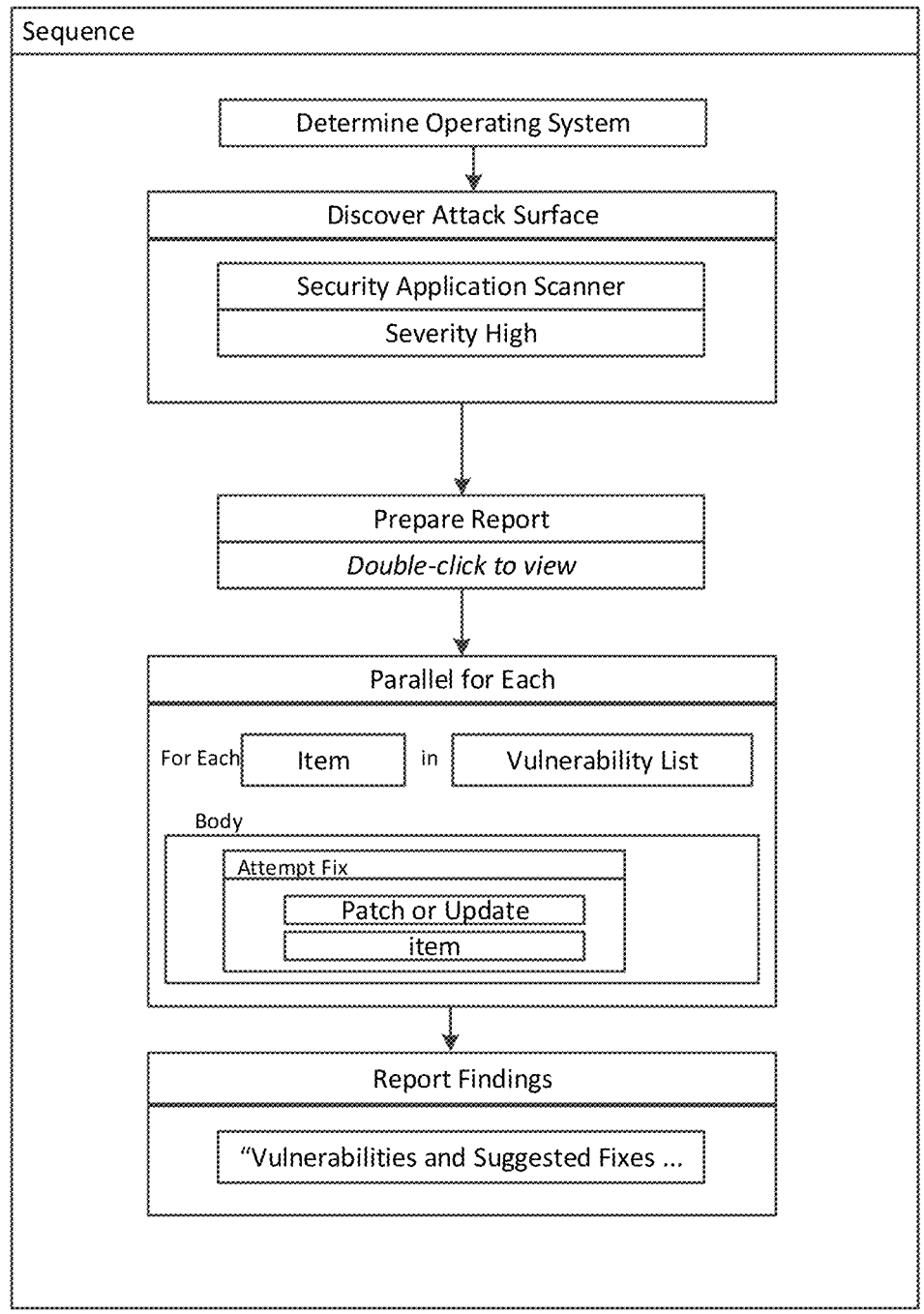
FIG. 8 is a diagram illustrating a workflow for executing a sequence of steps by one or more robots during a pen test, according to an embodiment of the present invention.

FIG. 8 is a diagram illustrating a workflow 800 for executing a sequence of steps by one or more robots during a pen test, according to an embodiment of the present invention. In some embodiment, workflows 800 begins with determining the operating system. Workflow 800 may then execute a discover attack surface sequence, which loads the parameters of the pen test and performs the test. Workflow 800 may then prepare a report from the pen test, and in response to the report, may perform patches or fixes to the vulnerabilities or security breaches found during the test. Workflow 800 may also generate a report findings. The report findings may include vulnerabilities and suggested fixes or fixes that were performed by the robot. It should be appreciated that one or more robots, with different access/permission levels, may execute workflow 800

Figure 9:
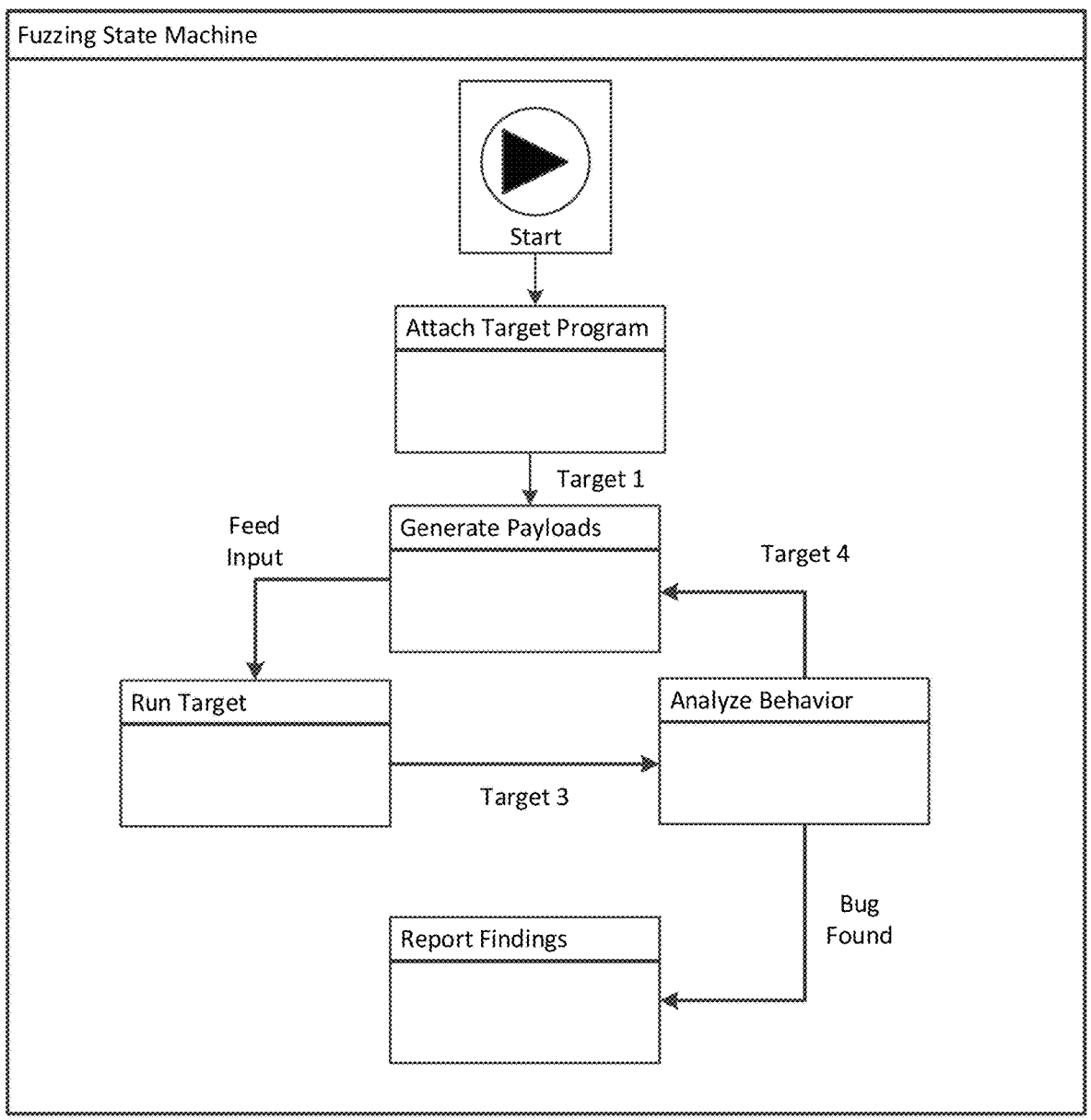
FIGS. 9 and 10 are diagrams illustrating a conceptual state machine and workflow for executing a targeted fuzzing approach, according to an embodiment of the present invention.
Figure 10:
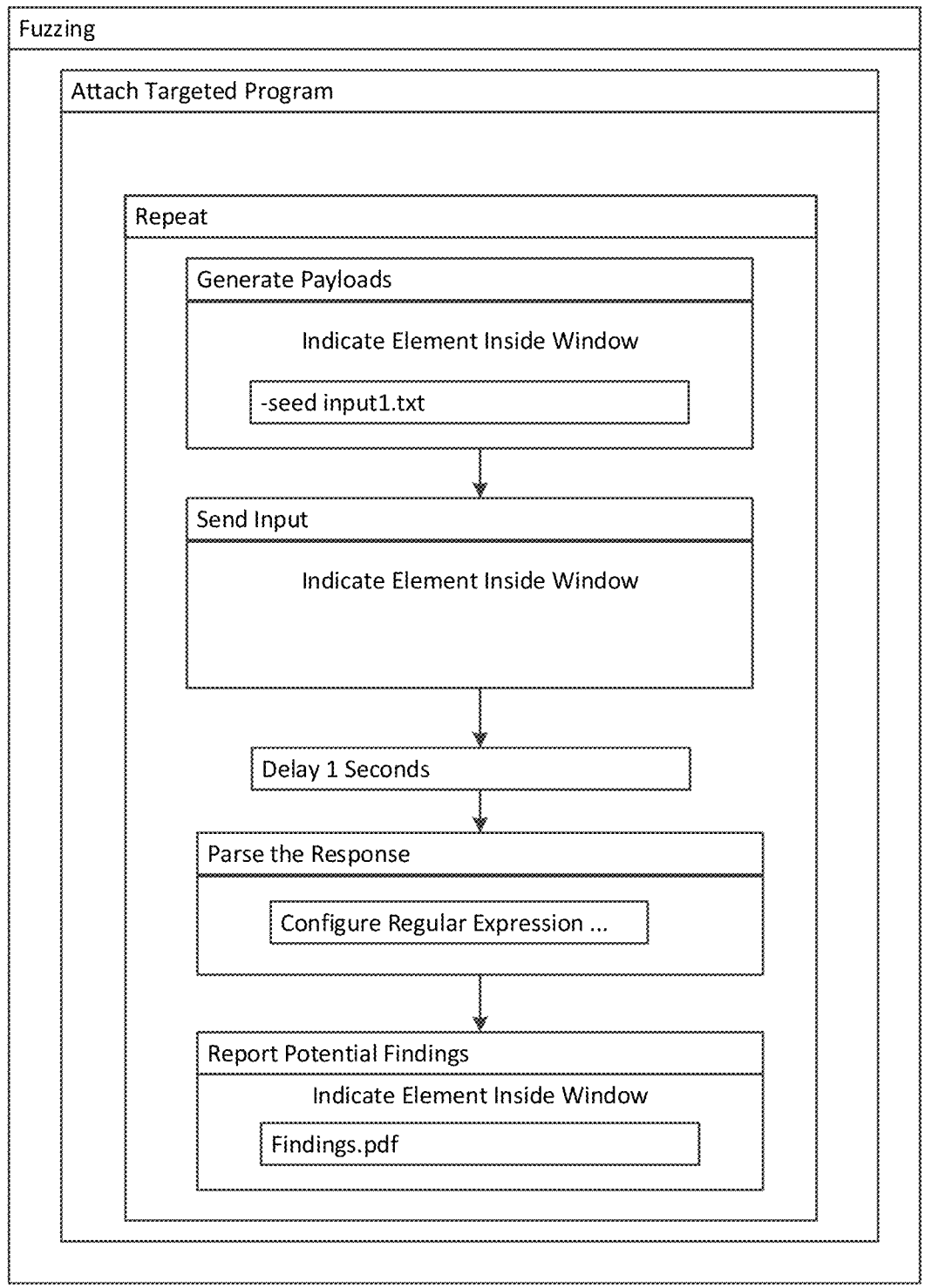

FIGS. 9 and 10 are diagrams illustrating a conceptual state machine and workflow 900, 1000, respectively, for executing a targeted fuzzing approach, according to an embodiment of the present invention. Both workflows 900, 1000 may be executed by one or more robots with different access/permission levels. To begin fuzzing, workflows 900 and 1000 are configurable to attach target program, and based on the target program, generate payloads for performing the fuzzing. Workflows 900 and 1000 may run the payloads against the target, and analyze the behavior of the run. Depending on the analysis, a report finding is generated or another target is created by the workflow to perform another fuzzing attack. The difference between workflows 900 and 1000 is that workflow 900 is a more simplified workflow, which is used for the purpose of explaining the concept of fuzzing.

Although some embodiments discuss the use of pen testing, it should be appreciated that the other techniques may be used. For example, any type of security testing or hardening may be executed by one or more robots.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method for performing penetration testing using robotic process automation (RPA), the method comprising:
    directly connecting one or more robots into an operating system of a platform;
    determining, by the one or more robots, a type of the operating system based on a port number of the operating system, binary of the operating system, or both;
    loading, by the one or more robots, a workflow associated with the operating system based on the type of the operating system;
    executing, by the one or more robots, the workflow to simulate the penetration testing of the operating system to identify malicious activity or vulnerable configurations within the operating system; and
    generating, by the one or more robots, a report for the user identifying the malicious activity or the vulnerable configurations within the operating system; and
    executing a workflow to perform corrective measures based on the generated report.

2. The computer-implemented method of claim 1, wherein the directly connecting of the one or more robots comprising:
    utilizing the one or more robots configured to perform a RPA process, and
    reassigning the one or more robots to perform the penetration testing.

3. The computer-implemented method of claim 1, wherein the directly connecting of the one or more robots comprising:
    deploying the one or more robots unassigned to one another RPA process, and
    assigning the one or more robots to perform the penetration testing.

4. The computer-implemented method of claim 1, wherein the executing of the penetration testing comprising:
    accessing the workflow specific for the operating system; and
    executing the workflow to cause the one or more robots to simulate the penetration testing.

5. The computer-implemented method of claim 1, wherein the executing of the penetration testing comprising:
    recording, by the one or more robots, actions performed by a penetration tester during a penetration test; and
    using, by the one or more robots, the recorded actions to create the workflow to simulate the penetration test.

6. The computer-implemented method of claim 1, wherein the executing of the penetration testing comprising:
    scanning, by the one or more robots, ports and services open or available within the OS, and identifying the ports and services with vulnerabilities and weak credential logins.

7. The computer-implemented method of claim 1, wherein the executing of the penetration testing comprising:
    attempting to access, by the one or more robots, one or more user accounts to identify one or more compromised user accounts, wherein
    the attempting to access of the one or more user accounts comprises using default login credentials for each the one or more user accounts, and
    identifying the one or more comprised user accounts that are granted access during the penetration testing.

8. The computer-implemented method of claim 1, further comprising:
    upon directly connecting with the operating system, determining, by the one or more robots, type of the operating system; and
    loading, by the one or more robots, the workflow associated with the type of operating system in order to execute the simulation of the penetration testing.

9. The computer-implemented method of claim 1, further comprising:
    modifying, by a system admin robot, one or more steps in a workflow to create a new workflow for simulating the penetration testing, or
    combining, by the system admin robot, two or more workflows to create a new workflow for simulating the penetration testing.

10. The computer-implemented method of claim 1, further comprising:
    receiving, by the system admin robot, the report identifying the malicious activity, misconfigurations or vulnerabilities within the operating system.

11. An apparatus configured to perform penetration testing using robotic processor automation (RPA), the apparatus comprising:
    memory comprising a set of instructions; and
    at least one processor, wherein
    the set of instructions are configured to cause the at least one processor to execute:
    directly connecting one or more robots into an operating system of a platform;
    determining, by the one or more robots, a type of the operating system based on a port number of the operating system, binary of the operating system, or both;
    loading, by the one or more robots, a workflow associated with the operating system based on the type of the operating system;
    executing, by the one or more robots, the workflow to simulate the penetration testing of the operating system to identify malicious activity, misconfigurations or vulnerabilities within the operating system;
    generating, by the one or more robots, a report for the user identifying the malicious activity, misconfigurations or vulnerabilities within the operating system; and
    executing a workflow to perform corrective measures based on the generated report.

12. The apparatus of claim 11, wherein the set of instructions are further configured to cause the at least one processor to execute:
    utilizing the one or more robots configured to perform a RPA process, and
    reassigning the one or more robots to perform the penetration testing.

13. The apparatus of claim 11, wherein the set of instructions are further configured to cause the at least one processor to execute:
deploying the one or more robots unassigned to one another RPA process, and
assigning the one or more robots to perform the penetration testing.

14. The apparatus of claim 11, wherein the set of instructions are further configured to cause the at least one processor to execute:
accessing the workflow specific for the operating system; and
executing the workflow to cause the one or more robots to simulate the penetration testing.

15. The apparatus of claim 11, wherein the set of instructions are further configured to cause the at least one processor to execute:
recording, by the one or more robots, actions performed by a penetration tester during a penetration test; and
using, by the one or more robots, the recorded actions to create the workflow to simulate the penetration test.

16. The apparatus of claim 11, wherein the set of instructions are further configured to cause the at least one processor to execute:
scanning, by the one or more robots, ports and services open or available within the OS, and identifying the ports and services with vulnerabilities and weak credential logins.

17. The apparatus of claim 11, wherein the set of instructions are further configured to cause the at least one processor to execute:
attempting to access, by the one or more robots, one or more user accounts to identify one or more compromised user accounts, wherein
the attempting to access of the one or more user accounts comprises using default login credentials for each the one or more user accounts, and
identifying the one or more comprised user accounts that are granted access during the penetration testing.

18. The apparatus of claim 11, the set of instructions are further configured to cause the at least one processor to execute:
upon directly connecting with the operating system, determining, by the one or more robots, type of the operating system; and
loading, by the one or more robots, the workflow associated with the type of operating system in order to execute the simulation of the penetration testing.

19. The apparatus of claim 11, the set of instructions are further configured to cause the at least one processor to execute:
modifying, by a system admin robot, one or more steps in a workflow to create a new workflow for simulating the penetration testing, or
combining, by the system admin robot, two or more workflows to create a new workflow for simulating the penetration testing.

20. The apparatus of claim 11, the set of instructions are further configured to cause the at least one processor to execute:
receiving, by the system admin robot, the report identifying the malicious activity, misconfigurations or vulnerabilities within the operating system.

21. A computer program embodied on a non-transitory computer-readable medium, the computer program is configured to cause at least one processor to execute:
directly connecting one or more robots into an operating system of a platform;
determining, by the one or more robots, a type of the operating system based on a port number of the operating system, binary of the operating system, or both;
loading, by the one or more robots, a workflow associated with the operating system based on the type of the operating system;
executing, by the one or more robots, the workflow to simulate the penetration testing of the operating system to identify malicious activity, misconfigurations or vulnerabilities within the operating system;
generating, by the one or more robots, a report for the user identifying the malicious activity, misconfigurations or vulnerabilities within the operating system; and
executing a workflow to perform corrective measures based on the generated report.

22. The computer program of claim 21, wherein the computer program is further configured to cause at least one processor to execute:
utilizing the one or more robots configured to perform a RPA process, and
reassigning the one or more robots to perform the penetration testing.

23. The computer program of claim 21, wherein the computer program is further configured to cause at least one processor to execute:
deploying the one or more robots unassigned to one another RPA process, and
assigning the one or more robots to perform the penetration testing.

24. The computer program of claim 21, wherein the computer program is further configured to cause at least one processor to execute:
accessing the workflow specific for the operating system; and
executing the workflow to cause the one or more robots to simulate the penetration testing.

25. The computer program of claim 21, wherein the computer program is further configured to cause at least one processor to execute:
recording, by the one or more robots, actions performed by a penetration tester during a penetration test; and
using, by the one or more robots, the recorded actions to create the workflow to simulate the penetration test.

26. The computer program of claim 21, wherein the computer program is further configured to cause at least one processor to execute:
scanning, by the one or more robots, ports and services open or available within the OS, and identifying the ports and services with vulnerabilities and weak credential logins.

27. The computer program of claim 21, wherein the computer program is further configured to cause at least one processor to execute:
attempting to access, by the one or more robots, one or more user accounts to identify one or more compromised user accounts, wherein
the attempting to access of the one or more user accounts comprises using default login credentials for each the one or more user accounts, and
identifying the one or more comprised user accounts that are granted access during the penetration testing.

28. The computer program of claim 21, wherein the computer program is further configured to cause at least one processor to execute:

upon directly connecting with the operating system, determining, by the one or more robots, type of the operating system; and loading, by the one or more robots, the workflow associated with the type of operating system in order to execute the simulation of the penetration testing.

29. The computer program of claim 21, wherein the computer program is further configured to cause at least one processor to execute:

modifying, by a system admin robot, one or more steps in a workflow to create a new workflow for simulating the penetration testing, or combining, by the system admin robot, two or more workflows to create a new workflow for simulating the penetration testing.

30. The computer program of claim 21, wherein the computer program is further configured to cause at least one processor to execute:

receiving, by the system admin robot, the report identifying the malicious activity, misconfigurations or vulnerabilities within the operating system.

* * * * *